(12) United States Patent
Tsai et al.

(10) Patent No.: US 9,052,451 B2
(45) Date of Patent: Jun. 9, 2015

(54) LIQUID LENS PACKAGE STRUCTURE

(71) Applicant: LUSTROUS ELECTRO-OPTIC CO., LTD., New Taipei (TW)

(72) Inventors: Chih-Wei Tsai, Hsinchu (TW); Jun-Yu Chung, Hsinchu (TW)

(73) Assignee: Lustrous Electro-Optic Co., Ltd., New Taipei (TW)

( * ) Notice: Subject to any disclaimer, the term of this patent is extended or adjusted under 35 U.S.C. 154(b) by 113 days.

(21) Appl. No.: 13/908,079

(22) Filed: Jun. 3, 2013

(65) Prior Publication Data

US 2014/0355128 A1    Dec. 4, 2014

(51) Int. Cl.
*G02B 1/06* (2006.01)
*G02B 3/12* (2006.01)
*G02B 3/14* (2006.01)

(52) U.S. Cl.
CPC ........................................ *G02B 3/14* (2013.01)

(58) Field of Classification Search
CPC ............ G02B 3/14; G02B 3/12; G02C 7/085; G02C 7/083; G02C 7/101
USPC ................................................. 359/665, 666
See application file for complete search history.

(56) References Cited

U.S. PATENT DOCUMENTS

| 5,436,766 | A | * | 7/1995 | Leary | 359/665 |
| 2008/0304160 | A1 | * | 12/2008 | Hendriks et al. | 359/666 |

* cited by examiner

*Primary Examiner* — Alicia M Harrington
(74) *Attorney, Agent, or Firm* — Rosenberg, Klein & Lee

(57) ABSTRACT

A liquid lens package structure includes a first light-transmitting element, a second light-transmitting element, a first elastic surrounding body, a second elastic surrounding body and a package unit. The first elastic surrounding body is disposed between the first and the second light-transmitting elements to form an enclosed space among the first light-transmitting element, the second light-transmitting element and the first elastic surrounding body for receiving and enclosing two unmingled predetermined liquids. The second elastic surrounding body is disposed on the second light-transmitting element. The package unit includes a first retaining seat and a second retaining seat mated with each other. The first retaining seat has a first opening, and the second retaining seat has a second opening. The first light-transmitting element, the first elastic surrounding body, the second light-transmitting element and the second elastic surrounding body are stacked sequentially between the first and the second retaining seats.

11 Claims, 16 Drawing Sheets

LIQUID LENS PACKAGE STRUCTURE

BACKGROUND OF THE INVENTION

1. Field of the Invention

The instant disclosure relates to a liquid lens package structure, and more particularly to a variable focus liquid lens package structure.

2. Description of Related Art

Cameras, mobile phone cameras and 3D-image processing devices often utilize a zoom lens to automatically focus, enlarge or reduce an image, so as to obtain a desired image. Conventionally, a zoom lens has multiple lens groups. These lens groups move along an optical axis of the lens to thereby change the spaces among them and accordingly, the overall focal length of the lens without affecting the imaging distance thereof. However, this type of lens needs relatively long lens group movement distance, and the movement distances of the lens groups are not in a linear relationship. Therefore, the zoom lens has difficulties in the structural design and control precision thereof, and has high manufacturing cost that could not be easily lowered. Currently, a liquid lens or liquid crystal lens (LC lens) has been used to improve the movement distances of lens groups in order to obtain reduced camera size.

According to the general principle of liquid lens, the liquid lens includes a tunable liquid-filled lens and a solid lens. By changing the shape of the liquid-filled lens to be a biconvex lens or a biconcave lens, or by using filling media of different refractive indexes, it is able to tune the focal length of the lens and achieve the purpose of zooming. Or, by using the liquid crystal-filled lens and changing the refractive index of the liquid crystal with an applied electric field, an electrically tunable-focus LC lens can be realized.

SUMMARY OF THE INVENTION

One aspect of the instant disclosure relates to a liquid lens package structure for preventing liquids from leaking out through the junction of the liquid lens package structure.

One of the embodiments of the instant disclosure provides a liquid lens package structure, comprising: a first light-transmitting unit, a second light-transmitting unit, a first elastic surrounding unit, a second elastic surrounding unit and a package unit. The first light-transmitting unit includes at least one first light-transmitting element, wherein the first light-transmitting element has a first top surface and a first bottom surface corresponding to the first top surface. The second light-transmitting unit includes at least one second light-transmitting element, wherein the second light-transmitting element has a second top surface and a second bottom surface corresponding to the second top surface. The first elastic surrounding unit includes at least one first elastic surrounding body, wherein the first elastic surrounding body is disposed between the first light-transmitting element and the second light-transmitting element to form an enclosed space among the first light-transmitting element, the second light-transmitting element and the first elastic surrounding body for receiving and enclosing two predetermined liquids that do not be mingled with each other, and the first elastic surrounding body has a first surrounding bottom side contacting the first top surface of the first light-transmitting element and a first surrounding top side corresponding to the first surrounding bottom side and contacting the second bottom surface of the second light-transmitting element. The second elastic surrounding unit includes at least one second elastic surrounding body disposed on the second top surface of the second light-transmitting element, wherein the second elastic surrounding body has a second surrounding bottom side contacting the second top surface of the second light-transmitting element and a second surrounding top side corresponding to the second surrounding bottom side. The package unit includes a first retaining seat and a second retaining seat mated with the first retaining seat, wherein the first retaining seat has a first opening for exposing one portion of the first bottom surface of the first light-transmitting element, the second retaining seat has a second opening for exposing one portion of the second top surface of the second light-transmitting element, and the first light-transmitting unit, the second light-transmitting unit, the first elastic surrounding unit and the second elastic surrounding unit are disposed between the first retaining seat and the second retaining seat.

More precisely, both the first light-transmitting element and the second light-transmitting element are transparent glass plate bodies, and the first top surface and the first bottom surface of the first light-transmitting element and the second top surface and the second bottom surface of the second light-transmitting element are plane surfaces.

More precisely, the first retaining seat is abutted against the first bottom surface of the first light-transmitting element, the second retaining seat is abutted against the second surrounding top side of the second elastic surrounding body, and the first light-transmitting unit, the first elastic surrounding unit, the second light-transmitting unit and the second elastic surrounding unit are tightly stacked on top of one another in sequence.

More precisely, the liquid lens package structure further comprises: a third elastic surrounding unit including at least one third elastic surrounding body disposed on the first bottom surface of the first light-transmitting element, wherein the third elastic surrounding body has a third surrounding top side contacting the first bottom surface of the first light-transmitting element and a third surrounding bottom side corresponding to the third surrounding top side, wherein the first retaining seat is abutted against the third surrounding bottom side of the third elastic surrounding body, the second retaining seat is abutted against the second surrounding top side of the second elastic surrounding body, and the third elastic surrounding unit, the first light-transmitting unit, the first elastic surrounding unit, the second light-transmitting unit and the second elastic surrounding unit are tightly stacked on top of one another in sequence.

More precisely, both the first elastic surrounding body and the second elastic surrounding body are elastic O rings, the size of the first elastic surrounding body is the same as or different from the second elastic surrounding body, the package unit has a predetermined thickness formed by mating the first retaining seat and the second retaining seat, and the number of the two predetermined liquids is adjusted according to the predetermined thickness of the package unit.

More precisely, the first retaining seat has a plurality of first retaining elements projected upwardly from the top surface thereof and a plurality of first retaining grooves respectively disposed on the first retaining elements, and the second retaining seat has a plurality of second retaining elements disposed on the inner surface thereof and respectively received in the first retaining grooves and a plurality of second retaining grooves respectively adjacent to the second retaining elements for respectively receiving the first retaining elements, thus the relative position between the first retaining seat and the second retaining seat is fixed.

More precisely, the first retaining seat has an outer screw structure projected upwardly from the top surface thereof, and the second retaining seat has an inner screw structure disposed on the inner surface thereof for mating with the outer screw structure, thus the relative position between the first retaining seat and the second retaining seat is fixed.

More precisely, the liquid lens package structure further comprises: a plurality of securing elements, wherein the first retaining seat has a plurality of first through holes, the second retaining seat has a plurality of second through holes correspondingly communicated with the first through holes, and each securing element passes through the corresponding first through hole and the corresponding second through hole, thus the relative position between the first retaining seat and the second retaining seat is fixed.

More precisely, the first retaining seat has a plurality of extending grooves concaved inwardly from the peripheral surface thereof and a plurality of retaining grooves respectively connected with the extending grooves, and the second retaining seat has a plurality of extending portions extended downwardly from the peripheral surface thereof and respectively received in the extending grooves and a plurality of retaining elements respectively connected with the extending portions and respectively retained in the retaining grooves, thus the relative position between the first retaining seat and the second retaining seat is fixed.

Another one of the embodiments of the instant disclosure provides a liquid lens package structure, comprising: a first light-transmitting unit, a second light-transmitting unit, a first elastic surrounding unit, a third elastic surrounding unit and a package unit. The first light-transmitting unit includes at least one first light-transmitting element, wherein the first light-transmitting element has a first top surface and a first bottom surface corresponding to the first top surface. The second light-transmitting unit includes at least one second light-transmitting element, wherein the second light-transmitting element has a second top surface and a second bottom surface corresponding to the second top surface. The first elastic surrounding unit includes at least one first elastic surrounding body, wherein the first elastic surrounding body is disposed between the first light-transmitting element and the second light-transmitting element to form an enclosed space among the first light-transmitting element, the second light-transmitting element and the first elastic surrounding body for receiving and enclosing two predetermined liquids that do not be mingled with each other, and the first elastic surrounding body has a first surrounding bottom side contacting the first top surface of the first light-transmitting element and a first surrounding top side corresponding to the first surrounding bottom side and contacting the second bottom surface of the second light-transmitting element. The third elastic surrounding unit includes at least one third elastic surrounding body disposed on the first bottom surface of the first light-transmitting element, wherein the third elastic surrounding body has a third surrounding top side contacting the first bottom surface of the first light-transmitting element and a third surrounding bottom side corresponding to the third surrounding top side. The package unit includes a first retaining seat and a second retaining seat mated with the first retaining seat, wherein the first retaining seat has a first opening for exposing one portion of the first bottom surface of the first light-transmitting element, the second retaining seat has a second opening for exposing one portion of the second top surface of the second light-transmitting element, and the first light-transmitting unit, the second light-transmitting unit, the first elastic surrounding unit and the third elastic surrounding unit are disposed between the first retaining seat and the second retaining seat.

Therefore, In conclusion, the first light-transmitting unit, the first elastic surrounding unit, the second light-transmitting unit and the second elastic surrounding unit can be tightly stacked on top of one another in sequence and retained between the first retaining seat and the second retaining seat, and the third elastic surrounding unit, the first light-transmitting unit, the first elastic surrounding unit, the second light-transmitting unit and the second elastic surrounding unit can be tightly stacked on top of one another in sequence and retained between the first retaining seat and the second retaining seat, thus the liquid lens package structure of the instant disclosure can be applied to prevent the two predetermined liquids from leaking out between the second light-transmitting element and the first elastic surrounding body during heat expansion or between the first light-transmitting element and the first elastic surrounding body during cold contraction.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1A:
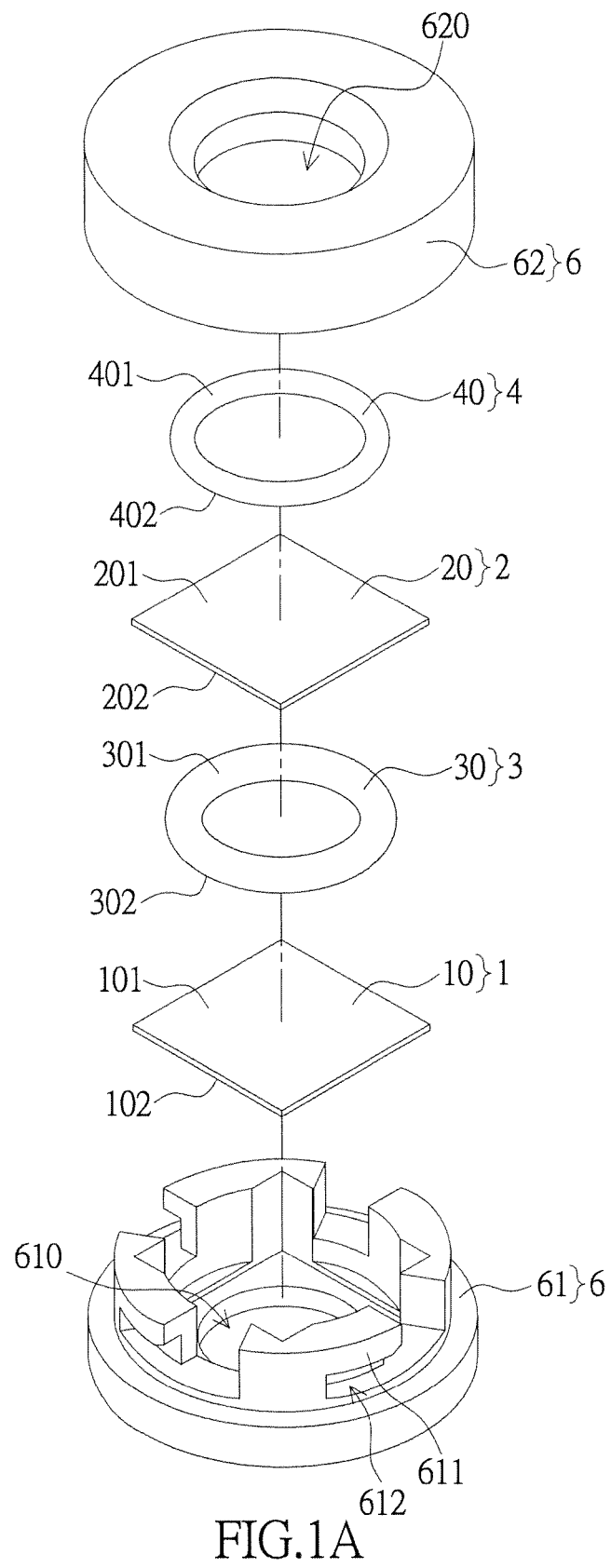
FIG. 1A shows a perspective, exploded, schematic view of the liquid lens package structure according to the first embodiment of the instant disclosure.
Figure 1B:
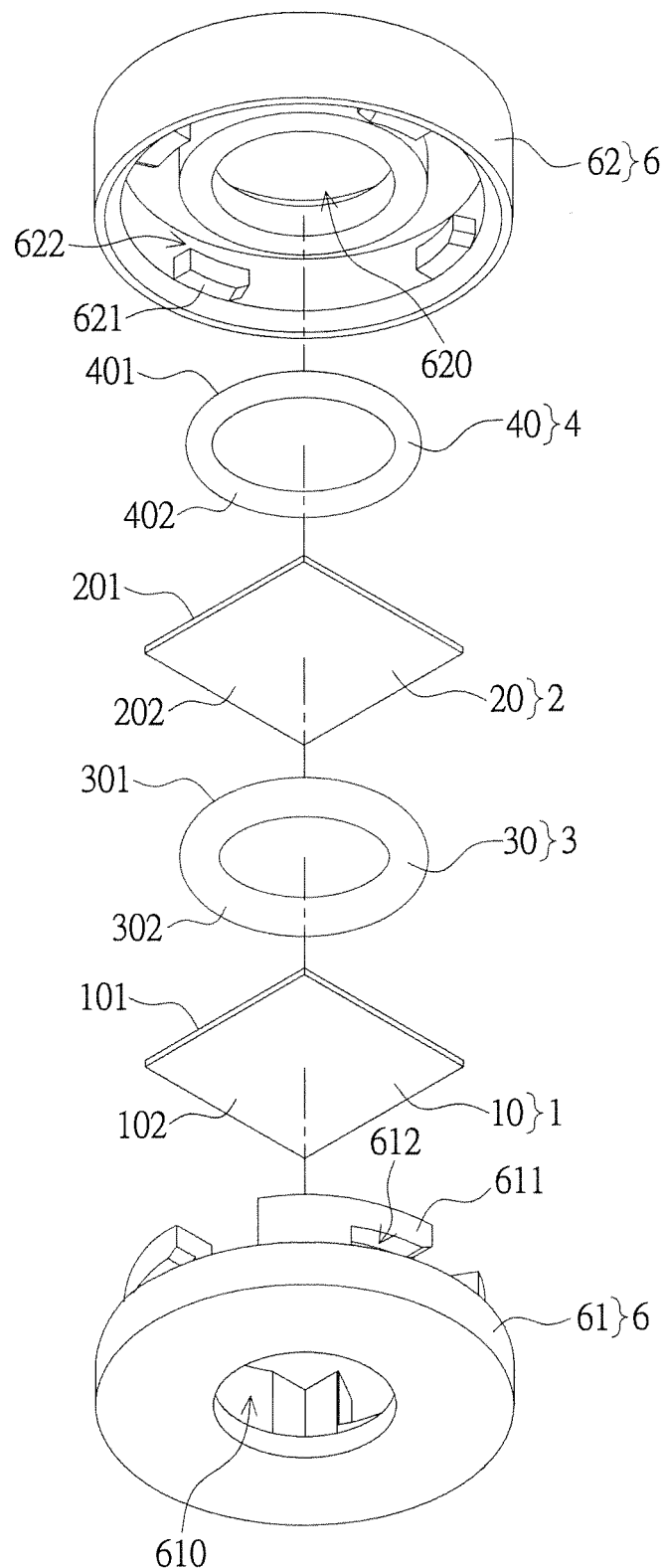
FIG. 1B shows another perspective, exploded, schematic view of the liquid lens package structure according to the first embodiment of the instant disclosure.
Figure 1C:
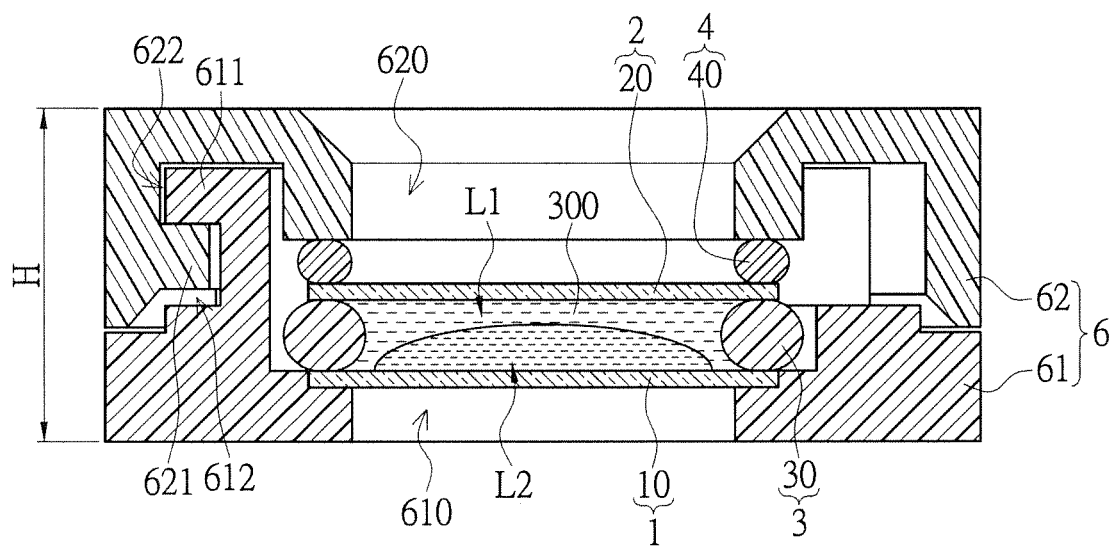
FIG. 1C shows a cross-sectional view of the liquid lens package structure according to the first embodiment of the instant disclosure.

Referring to FIG. 1A to FIG. 1C, where FIG. 1A shows a perspective, exploded, schematic view of the liquid lens package structure, FIG. 1B shows another perspective, exploded, schematic view of the liquid lens package structure, and FIG. 1C shows a cross-sectional view of the liquid lens package structure. The first embodiment of the instant disclosure provides a liquid lens package structure for preventing the liquids from leaking out, comprising: a first light-transmitting unit 1, a second light-transmitting unit 2, a first elastic surrounding unit 3, a second elastic surrounding unit 4 and a package unit 6.

First, the first light-transmitting unit 1 includes at least one first light-transmitting element 10, and the first light-transmitting element 10 has a first top surface 101 and a first bottom surface 102 corresponding and opposite to the first top surface 101. Moreover, the second light-transmitting unit 2 includes at least one second light-transmitting element 20, and the second light-transmitting element 20 has a second top surface 201 and a second bottom surface 202 corresponding and opposite to the second top surface 201. For example, both the first light-transmitting element 10 and the second light-transmitting element 20 may be transparent glass plate bodies shown as squares, and the first top surface 101 and the first bottom surface 102 of the first light-transmitting element 10 and the second top surface 201 and the second bottom surface 202 of the second light-transmitting element 20 may be plane surfaces. Of course, both the first light-transmitting element 10 and the second light-transmitting element 20 may be plane-concave lens, plane-concave lens, concave-convex lens, or convex-concave lens etc. In addition, one of the first light-transmitting element 10 and the second light-transmitting element 20 may be a driving circuit board for providing a predetermined voltage. However, the above-mentioned design for the first light-transmitting element 10 and the second light-transmitting element 20 of the first embodiment is merely an example and is not meant to limit the instant disclosure.

Furthermore, the first elastic surrounding unit 3 includes at least one first elastic surrounding body 30, and the first elastic surrounding body 30 has a first surrounding bottom side 302 contacting the first top surface 101 of the first light-transmitting element 10 and a first surrounding top side 301 corresponding to the first surrounding bottom side 302 and contacting the second bottom surface 202 of the second light-transmitting element 20. More precisely, the first elastic surrounding body 30 is disposed between the first light-transmitting element 10 and the second light-transmitting element 20 to form an enclosed space 300 among the first light-transmitting element 10, the second light-transmitting element 20 and the first elastic surrounding body 30 for receiving and enclosing two predetermined liquids (L1, L2) that do not be mingled (blended or mixed) with each other (as shown in FIG. 1C). The liquid interface between the two unmingled predetermined liquids (L1, L2) can provide a variable lens curvature, and the variable lens curvature of the liquid interface between the two unmingled predetermined liquids (L1, L2) can be adjusted according to the predetermined voltage value that is provided by the driving circuit board such as the first light-transmitting element 10 or the second light-transmitting element 20. In addition, the second elastic surrounding unit 4 includes at least one second elastic surrounding body 40 disposed on the second top surface 201 of the second light-transmitting element 20, and the second elastic surrounding body 40 has a second surrounding bottom side 402 contacting the second top surface 201 of the second light-transmitting element 20 and a second surrounding top side 401 corresponding to the second surrounding bottom side 402. For example, both the first elastic surrounding body 30 and the second elastic surrounding body 40 may be elastic or flexible O rings. The size of the first elastic surrounding body 30 is the same as or different from the second elastic surrounding body 40 according to different requirements. However, the above-mentioned design for the first elastic surrounding body 30 and the second elastic surrounding body 40 of the first embodiment is merely an example and is not meant to limit the instant disclosure.

Furthermore, the package unit 6 includes a first retaining seat 61 and a second retaining seat 62 mated with the first retaining seat 61 by any mating methods. The first retaining seat 61 has a first opening 610 for exposing one portion of the first bottom surface 102 of the first light-transmitting element 10, the second retaining seat 62 has a second opening 620 for exposing one portion of the second top surface 201 of the second light-transmitting element 20, and the first light-transmitting unit 1, the second light-transmitting unit 2, the first elastic surrounding unit 3 and the second elastic surrounding unit 4 are disposed between the first retaining seat 61 and the second retaining seat 62. In addition, after mating the first retaining seat 61 with the second retaining seat 62, both the first elastic surrounding body 30 and the second elastic surrounding body 40 can be pressed by a predetermined compression deformation, thus the two unmingled predetermined liquids (L1, L2) can be effectively enclosed in the enclosed space 300. More precisely, referring to FIG. 1C, the first retaining seat 61 can be abutted against the first bottom surface 102 of the first light-transmitting element 10, and the second retaining seat 62 can be abutted against the second surrounding top side 401 of the second elastic surrounding body 40, thus the first light-transmitting unit 1, the first elastic surrounding unit 3, the second light-transmitting unit 2 and the second elastic surrounding unit 4 can be tightly stacked on top of one another in sequence. In addition, referring to FIG. 1C, the first retaining seat 61 has a receiving groove (no label) for receiving the first light-transmitting element 10, and the second retaining seat 62 has an annular protrusion (no label) abutted against the second surrounding top side 401 of the second elastic surrounding body 40. Moreover, the package unit 6 has a predetermined thickness H formed by mating the first retaining seat 61 and the second retaining seat 62, thus the number of the two predetermined liquids (L1, L2) can be adjusted according to the predetermined thickness H of the package unit 6. In other words, when the predetermined thickness H of the package unit 6 is increased gradually, the number or the volume of the two predetermined liquids (L1, L2) received in the enclosed space 300 can be increased correspondingly.

For example, the first retaining seat 61 has a plurality of first retaining elements 611 projected upwardly from the top surface thereof and a plurality of first retaining grooves 612 respectively disposed on the first retaining elements 611, and the second retaining seat 62 has a plurality of second retaining elements 621 disposed on the inner surface thereof and respectively received in the first retaining grooves 612 and a plurality of second retaining grooves 622 respectively adjacent to the second retaining elements 621 for respectively receiving the first retaining elements 611, thus the relative position between the first retaining seat 61 and the second retaining seat 62 can be fixed. In other words, the relative position between the first retaining seat 61 and the second retaining seat 62 can be fixed quickly by matching the first retaining element 611 and the second retaining groove 622 and matching the first retaining groove 612 and the second retaining element 621.

Figure 1D:
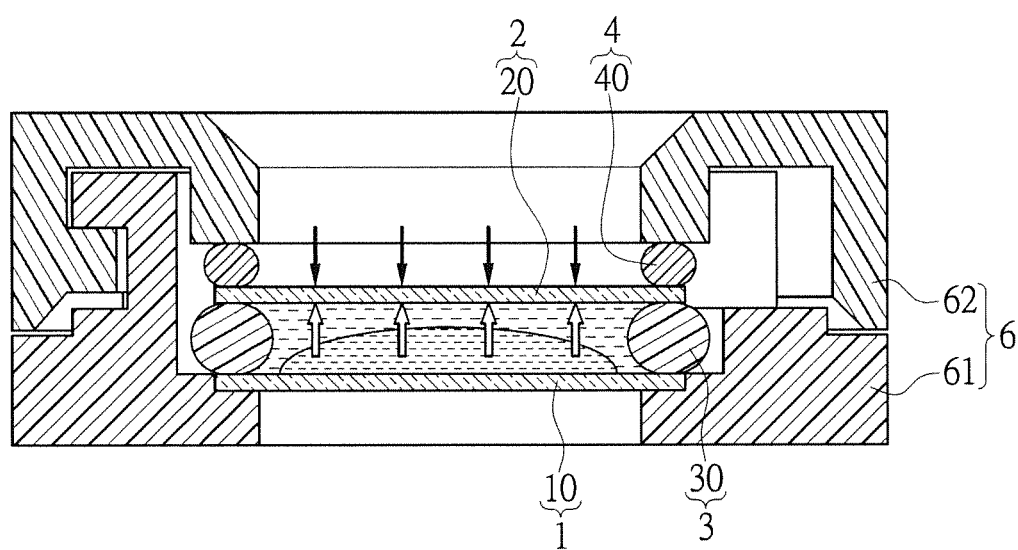
FIG. 1D shows a schematic view of the second elastic surrounding body providing corresponding resistances for preventing the predetermined liquids from leaking out during heat expansion according to the first embodiment of the instant disclosure.
Figure 1E:
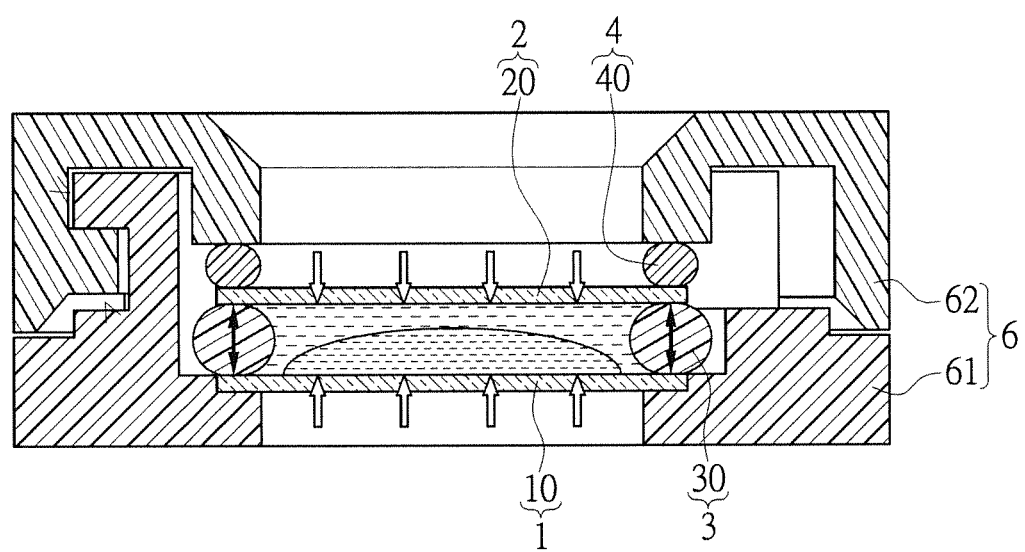
FIG. 1E shows a schematic view of the first elastic surrounding body providing corresponding resistances for preventing the predetermined liquids from leaking out during cold contraction according to the first embodiment of the instant disclosure.

Referring to FIG. 1D and FIG. 1E, where FIG. 1D shows a schematic view of the second elastic surrounding body providing corresponding resistances for preventing the predetermined liquids from leaking out during heat expansion, and FIG. 1E shows a schematic view of the first elastic surrounding body providing corresponding resistances for preventing the predetermined liquids from leaking out during cold contraction. As shown in FIG. 1D, when heat expands the two predetermined liquids (L1, L2), the two predetermined liquids (L1, L2) can generate upward thrust forces (shown as the hollow arrows in FIG. 1D) applied to (or acted on) the second light-transmitting element 20. At this moment, the second elastic surrounding body 40 can provide corresponding downward resistances (shown as the solid arrows in FIG. 1D) to resist the upward thrust forces (such as upward push forces) generated by the two predetermined liquids (L1, L2) during heat expansion, thus the second light-transmitting element 20 cannot be separated from the first elastic surrounding body 30 during the thermal expansion for preventing the two predetermined liquids (L1, L2) from leaking out between the second light-transmitting element 20 and the first elastic surrounding body 30 (i.e., for preventing the two predetermined liquids (L1, L2) from leaking out through a small gap between the second light-transmitting element 20 and the first elastic surrounding body 30). As shown in FIG. 1E, when cold contracts the two predetermined liquids (L1, L2), the two predetermined liquids (L1, L2) can generate inward pull forces (shown as the hollow arrows in FIG. 1E) applied to the first light-transmitting element 10 and the second light-transmitting element 20. At this moment, the first elastic surrounding body 30 can provide corresponding outward resistances (shown as the solid arrows in FIG. 1E) to resist the inward pull forces generated by the two predetermined liquids (L1, L2), thus the first light-transmitting element 10 and the second light-transmitting element 20 cannot be pulled inwardly to be close to each other during cold contraction for preventing the two predetermined liquids (L1, L2) from leaking out between the first light-transmitting element 10 and the first elastic surrounding body 30 (i.e., for preventing the two predetermined liquids (L1, L2) from leaking out through a small gap between the first light-transmitting element 10 and the first elastic surrounding body 30).

Figure 1F:
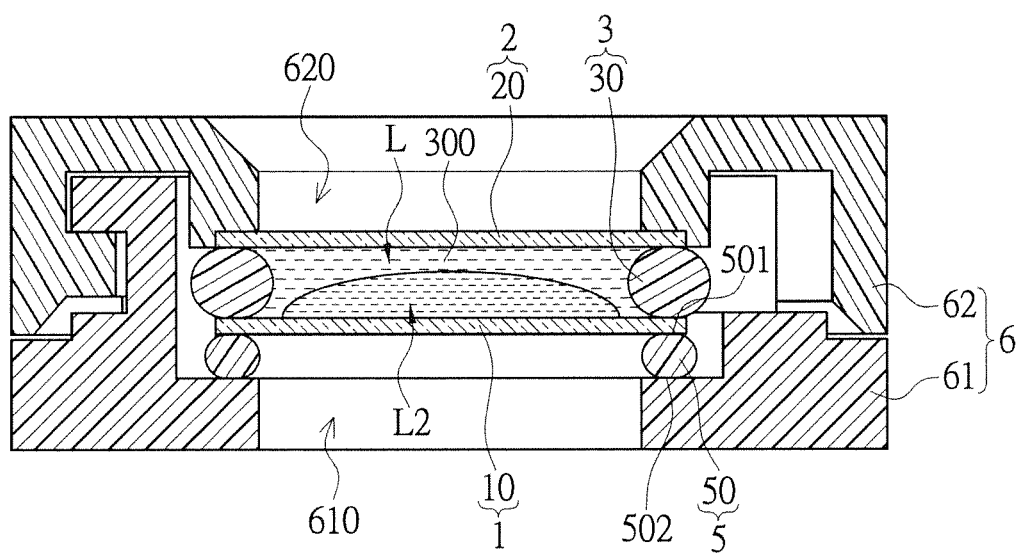
FIG. 1F shows a cross-sectional view of the second elastic surrounding body replaced by the third elastic surrounding body according to the first embodiment of the instant disclosure.

Referring to FIG. 1F, the second elastic surrounding unit 4 of the instant disclosure can be replaced by a third elastic surrounding unit 5. The third elastic surrounding unit 5 includes at least one third elastic surrounding body 50 disposed on the first bottom surface 102 of the first light-transmitting element 10, and the third elastic surrounding body 50 has a third surrounding top side 501 contacting the first bottom surface 102 of the first light-transmitting element 10 and a third surrounding bottom side 502 corresponding to the third surrounding top side 501. More precisely, when the first light-transmitting unit 1, the second light-transmitting unit 2, the first elastic surrounding unit 3 and the third elastic surrounding unit 5 are disposed between the first retaining seat 61 and the second retaining seat 62, the first retaining seat 61 can be abutted against the third surrounding bottom side 502 of the third elastic surrounding body 50, and the second retaining seat 62 can be abutted against the second top surface 201 of the second light-transmitting element 20. Hence, third elastic surrounding unit 5, the first light-transmitting unit 1, the first elastic surrounding unit 3 and the second light-transmitting unit 2 can be tightly stacked on top of one another in sequence. In addition, when the first retaining seat 61 and the second retaining seat 62 are mated with each other, both the first elastic surrounding body 30 and the third elastic surrounding body 50 can be pressed by a predetermined compression deformation, thus the two unmingled predetermined liquids (L1, L2) can be effectively enclosed in the enclosed space 300.

Figure 1G:
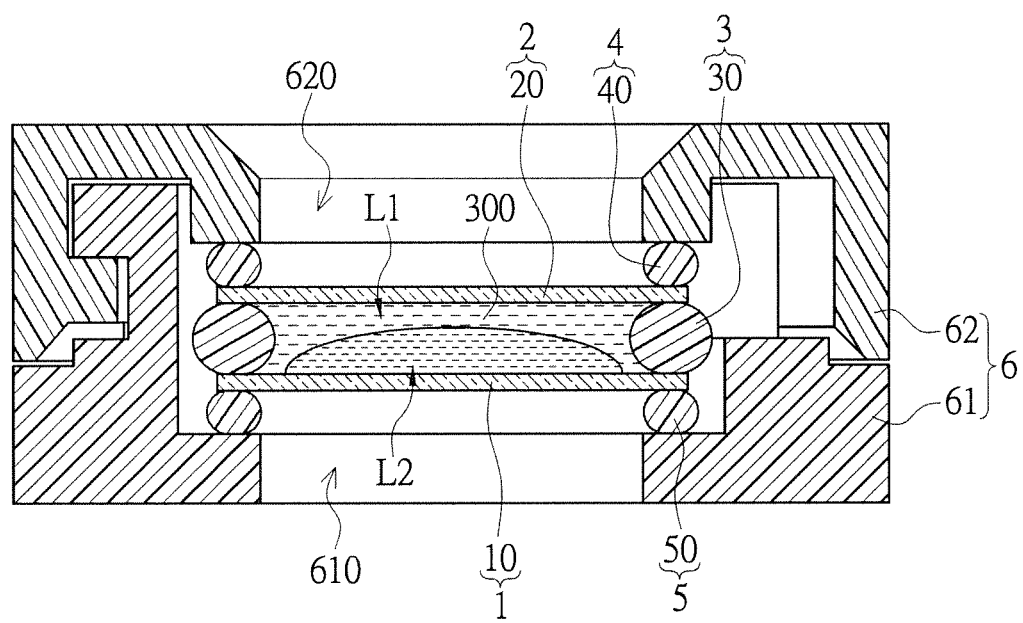
FIG. 1G shows a cross-sectional view of the liquid lens package structure concurrently using the first elastic surrounding body, the second elastic surrounding body and the third elastic surrounding body according to the first embodiment of the instant disclosure.

Referring to FIG. 1G, the instant disclosure can concurrently use the second elastic surrounding unit 4 and the third elastic surrounding unit 5. Whereby, when the first light-transmitting unit 1, the second light-transmitting unit 2, the first elastic surrounding unit 3, the second elastic surrounding unit 4 and the third elastic surrounding unit 5 are disposed between the first retaining seat 61 and the second retaining seat 62, the first retaining seat 61 can be abutted against the third surrounding bottom side 502 of the third elastic surrounding body 50, and the second retaining seat 62 can be abutted against the second surrounding top side 401 of the second elastic surrounding body 40. Hence, third elastic surrounding unit 5, the first light-transmitting unit 1, the first elastic surrounding unit 3, the second light-transmitting unit 2 and the second elastic surrounding unit 4 can be tightly stacked on top of one another in sequence. In addition, when the first retaining seat 61 and the second retaining seat 62 are mated with each other, both the first elastic surrounding body 30, the second elastic surrounding body 40 and the third elastic surrounding body 50 can be pressed by a predetermined compression deformation, thus the two unmingled predetermined liquids (L1, L2) can be effectively enclosed in the enclosed space 300.

Second Embodiment

Figure 2A:
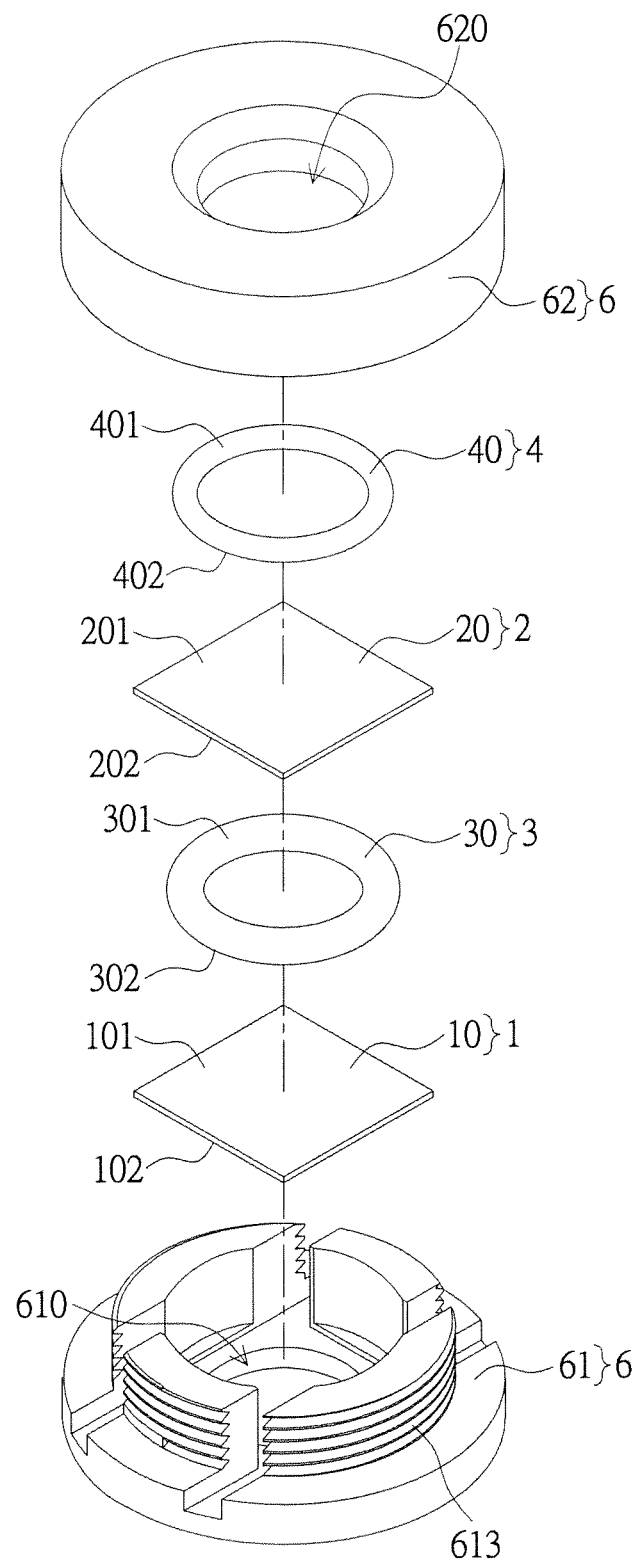
FIG. 2A shows a perspective, exploded, schematic view of the liquid lens package structure according to the second embodiment of the instant disclosure.
Figure 2B:
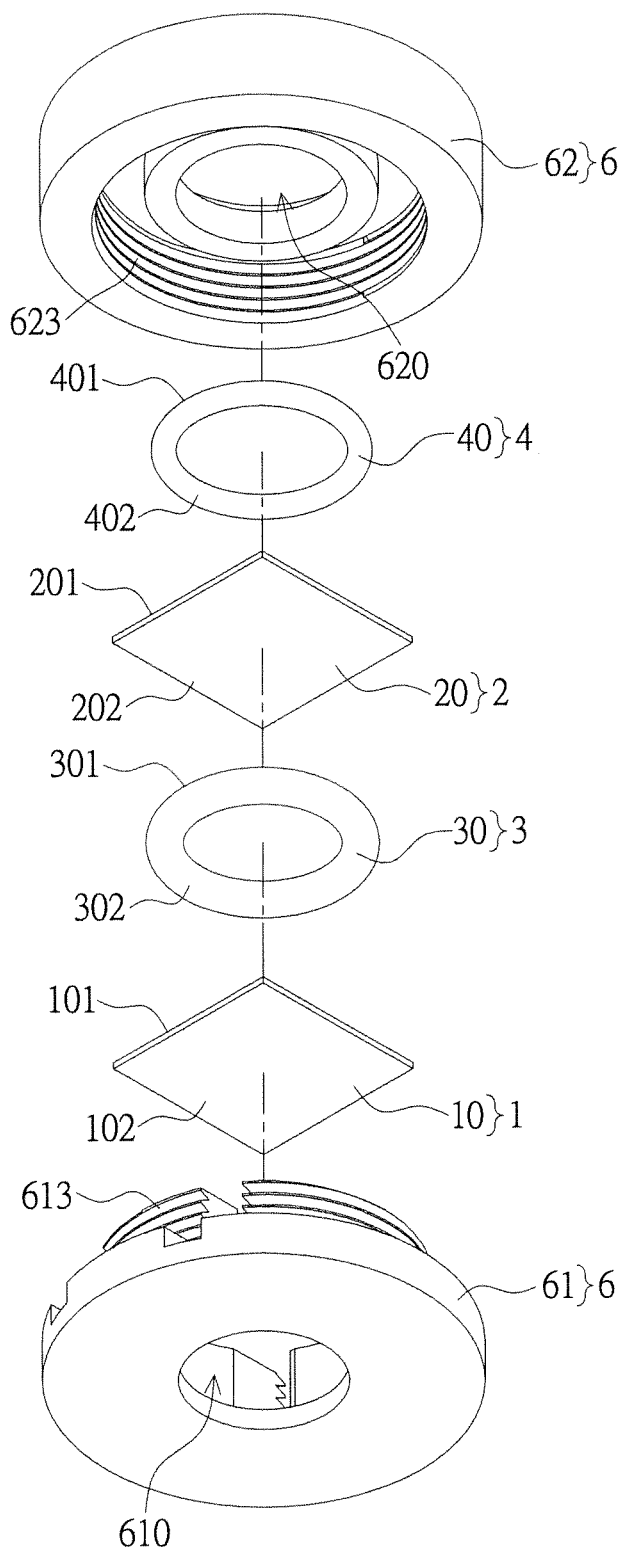
FIG. 2B shows another perspective, exploded, schematic view of the liquid lens package structure according to the second embodiment of the instant disclosure.
Figure 2C:
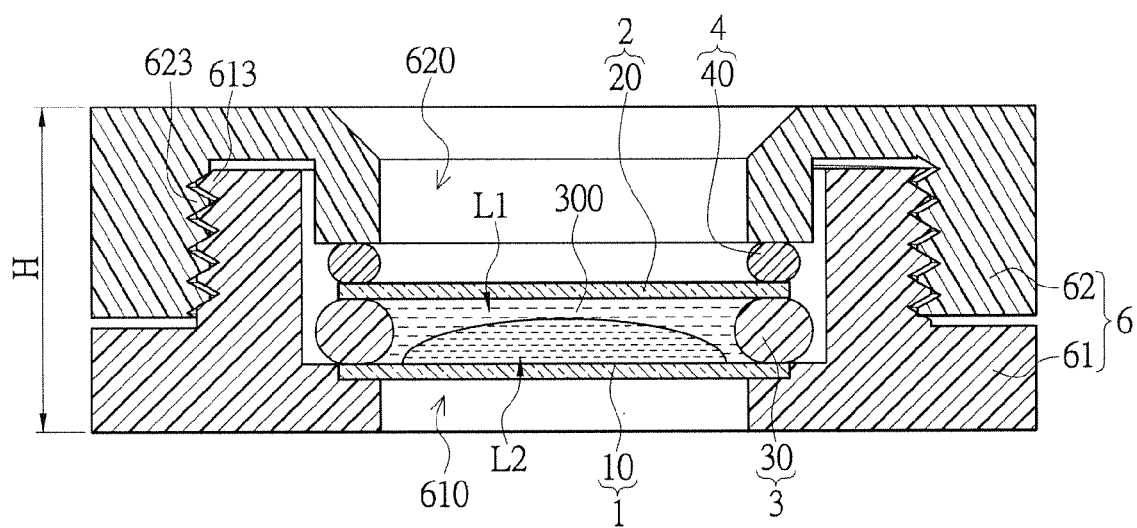
FIG. 2C shows a cross-sectional view of the liquid lens package structure according to the second embodiment of the instant disclosure.

Referring to FIG. 2A to FIG. 2C, where the second embodiment of the instant disclosure provides a liquid lens package structure for preventing the liquids from leaking out, comprising: a first light-transmitting unit 1, a second light-transmitting unit 2, a first elastic surrounding unit 3, a second elastic surrounding unit 4 and a package unit 6. Comparing FIGS. 2A-2C with FIGS. 1A-1C, the difference between the second embodiment and the first embodiment is as follows: in the second embodiment, the first retaining seat 61 has an outer screw structure 613 projected upwardly from the top surface thereof, and the second retaining seat 62 has an inner screw structure 623 disposed on the inner surface thereof for mating with the outer screw structure 613, thus the relative position between the first retaining seat 61 and the second retaining seat 62 can be fixed. In other words, the relative position between the first retaining seat 61 and the second retaining seat 62 can be fixed and positioned quickly by matching the outer screw structure 613 and the inner screw structure 623.

Third Embodiment

Figure 3A:
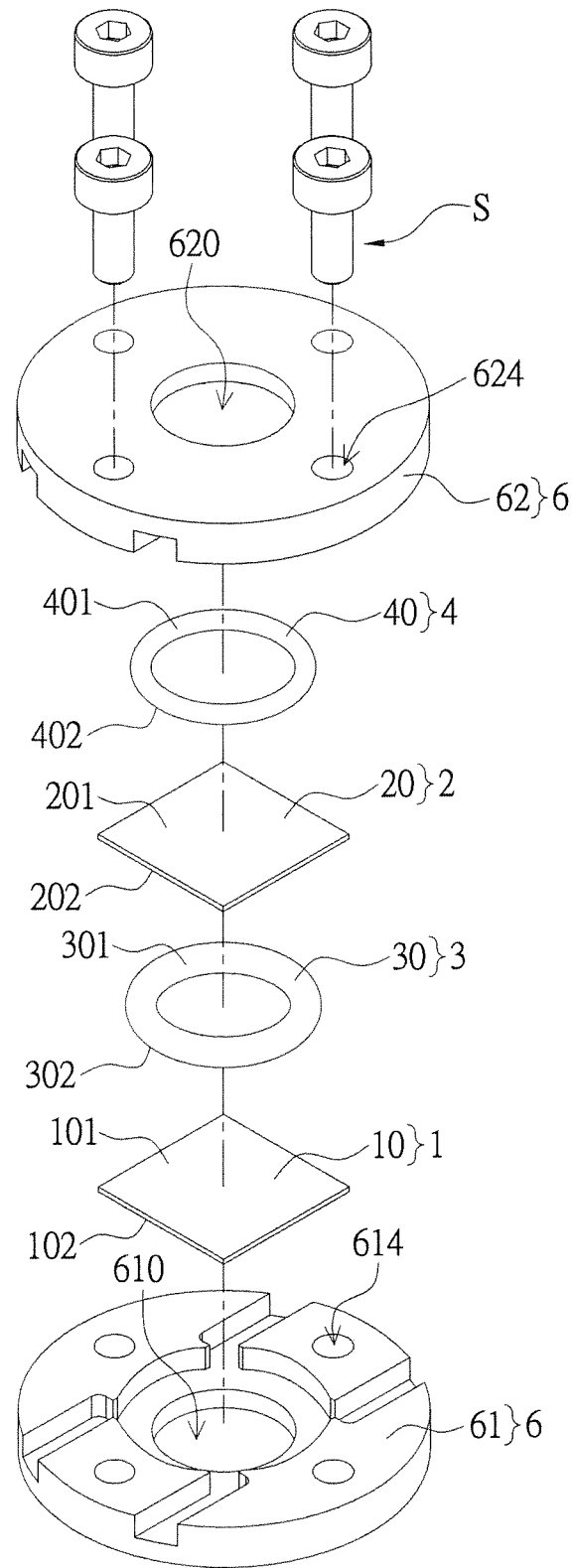
FIG. 3A shows a perspective, exploded, schematic view of the liquid lens package structure according to the third embodiment of the instant disclosure.
Figure 3B:
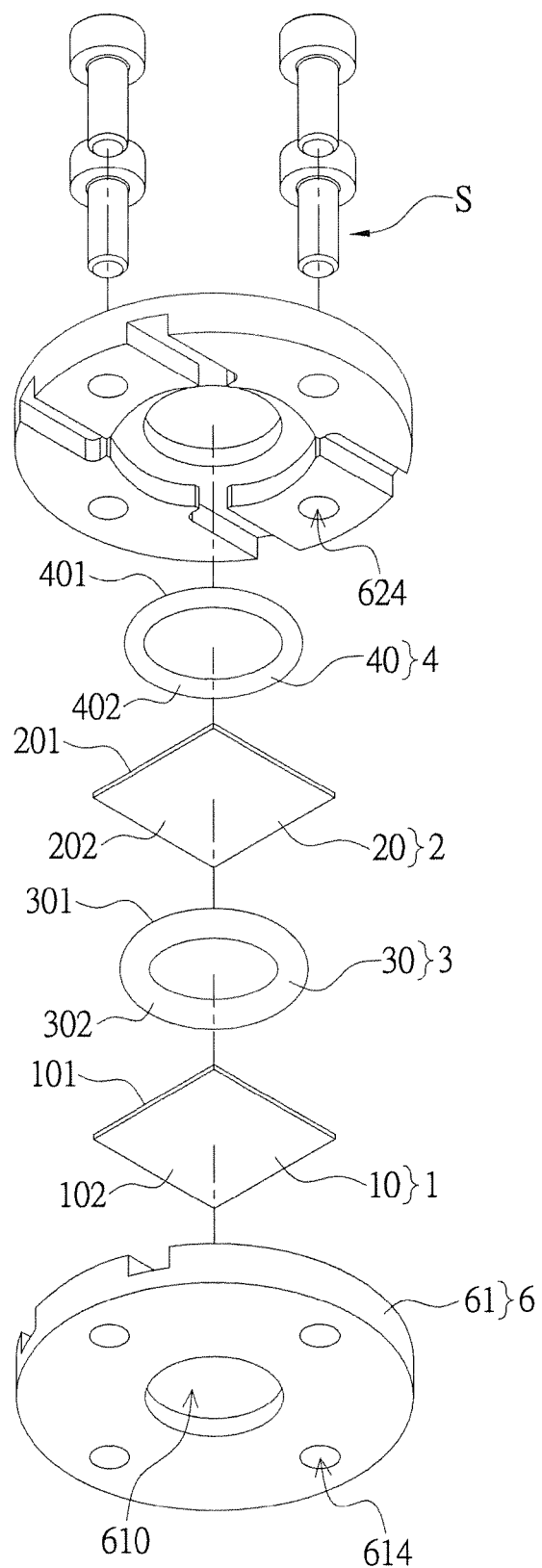
FIG. 3B shows another perspective, exploded, schematic view of the liquid lens package structure according to the third embodiment of the instant disclosure.
Figure 3C:
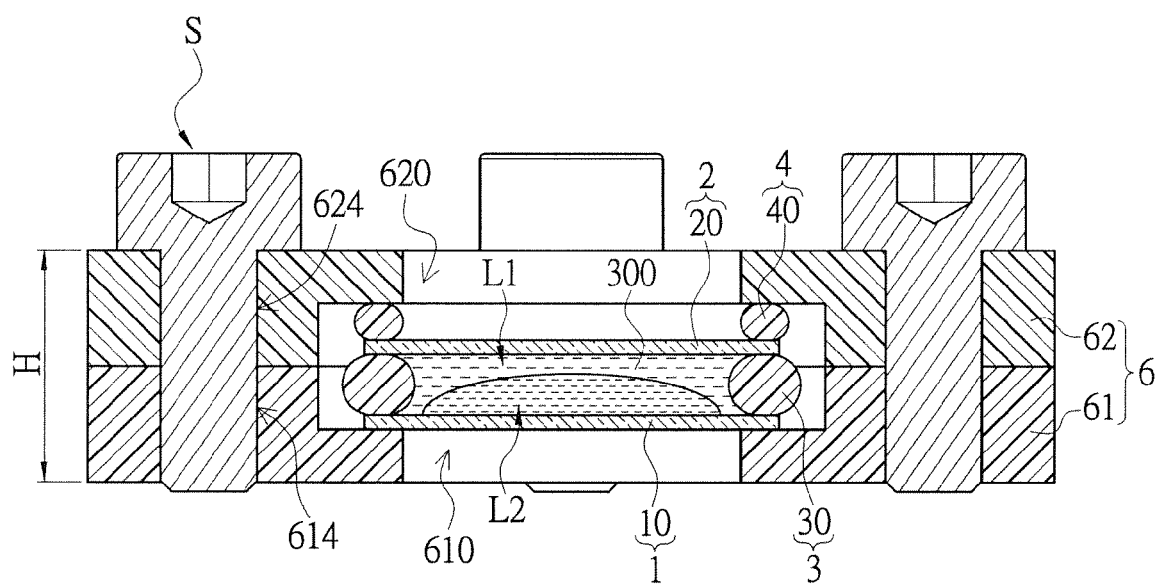
FIG. 3C shows a cross-sectional view of the liquid lens package structure according to the third embodiment of the instant disclosure.

Referring to FIG. 3A to FIG. 3C, where the third embodiment of the instant disclosure provides a liquid lens package structure for preventing the liquids from leaking out, comprising: a first light-transmitting unit 1, a second light-transmitting unit 2, a first elastic surrounding unit 3, a second elastic surrounding unit 4 and a package unit 6. Comparing FIGS. 3A-3C with FIGS. 1A-1C, the difference between the third embodiment and the first embodiment is as follows: the liquid lens package structure of the third embodiment further comprises a plurality of securing elements S such as screw bolts. The first retaining seat 61 has a plurality of first through holes 614, the second retaining seat 62 has a plurality of second through holes 624 correspondingly communicated with the first through holes 614, and each securing element S can pass through the corresponding first through hole 614 and the corresponding second through hole 624, thus the relative position between the first retaining seat 61 and the second retaining seat 62 can be fixed. In other words, the relative position between the first retaining seat 61 and the second retaining seat 62 can be fixed and positioned quickly by matching the securing elements S, the first through holes 614 and second through holes 624.

Fourth Embodiment

Figure 4A:
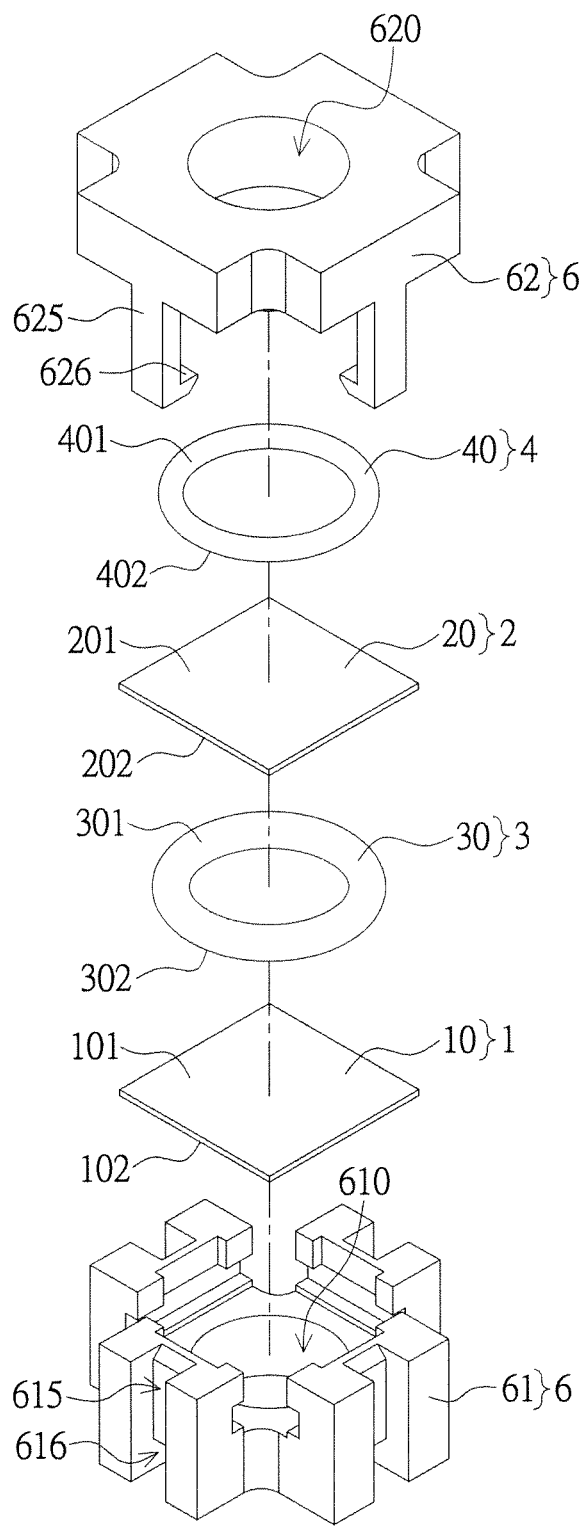
FIG. 4A shows a perspective, exploded, schematic view of the liquid lens package structure according to the fourth embodiment of the instant disclosure.
Figure 4B:
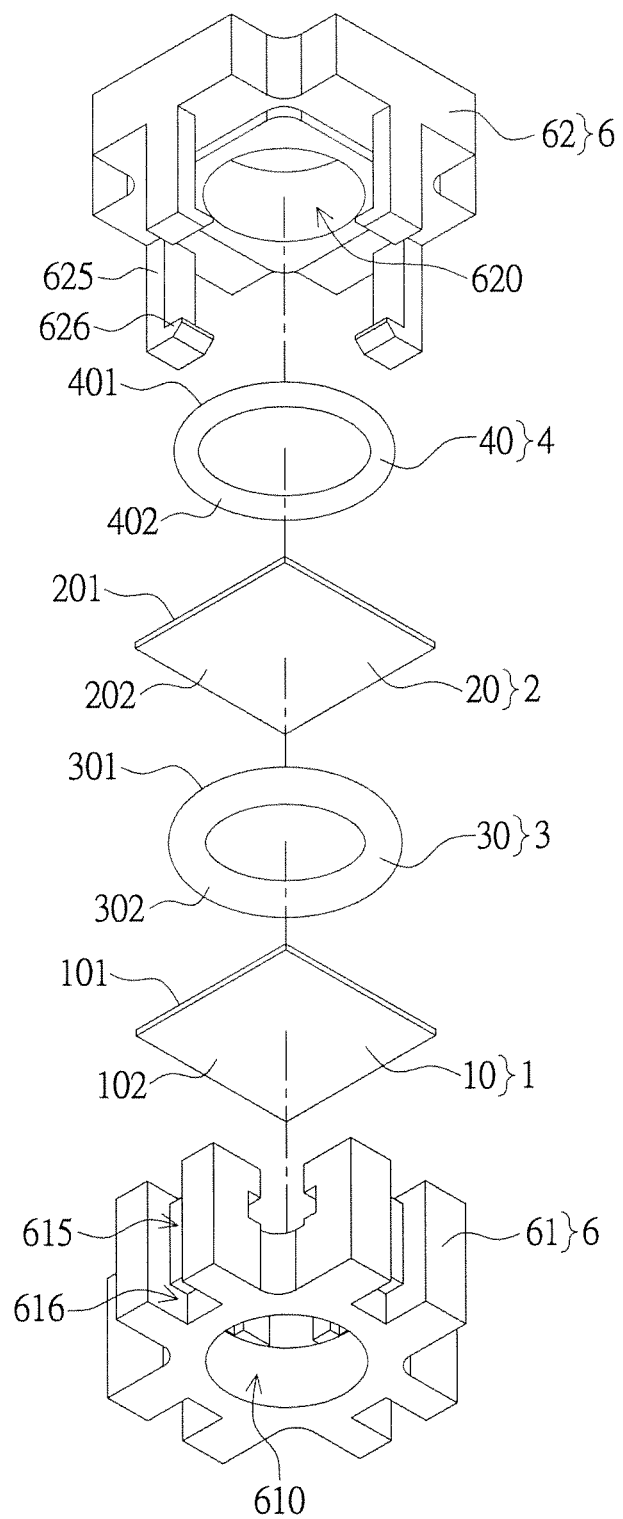
FIG. 4B shows another perspective, exploded, schematic view of the liquid lens package structure according to the fourth embodiment of the instant disclosure.
Figure 4C:
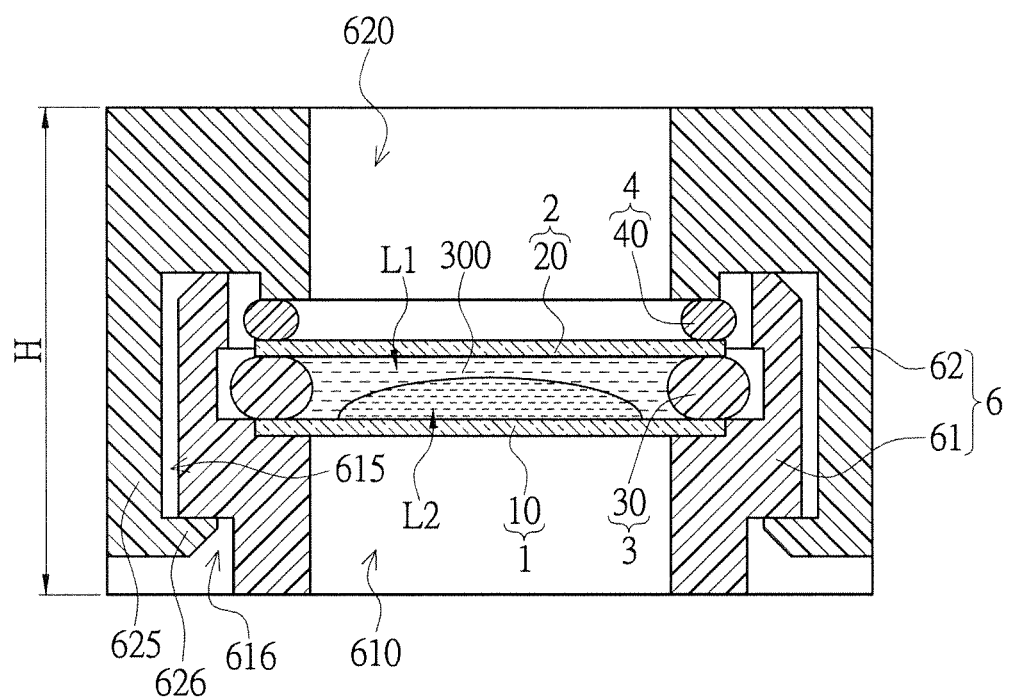
FIG. 4C shows a cross-sectional view of the liquid lens package structure according to the fourth embodiment of the instant disclosure.

Referring to FIG. 4A to FIG. 4C, where the fourth embodiment of the instant disclosure provides a liquid lens package structure for preventing the liquids from leaking out, comprising: a first light-transmitting unit 1, a second light-transmitting unit 2, a first elastic surrounding unit 3, a second elastic surrounding unit 4 and a package unit 6. Comparing FIGS. 4A-4C with FIGS. 1A-1C, the difference between the fourth embodiment and the first embodiment is as follows: in the fourth embodiment, the first retaining seat 61 has a plurality of extending grooves 615 concaved inwardly from the peripheral surface thereof and a plurality of retaining grooves 616 respectively connected with the extending grooves 615, and the second retaining seat 62 has a plurality of extending portions 625 extended downwardly from the peripheral surface thereof and respectively received in the extending grooves 615 and a plurality of retaining elements 626 respectively connected with the extending portions 625 and respectively retained in the retaining grooves 616, thus the relative position between the first retaining seat 61 and the second retaining seat 62 can be fixed. In other words, the relative position between the first retaining seat 61 and the second retaining seat 62 can be fixed and positioned quickly by matching the retaining elements 626 and the retaining grooves 616.

In conclusion, the first light-transmitting unit 1, the first elastic surrounding unit 3, the second light-transmitting unit 2 and the second elastic surrounding unit 4 can be tightly stacked on top of one another in sequence and retained between the first retaining seat 61 and the second retaining seat 62, and the third elastic surrounding unit 5, the first light-transmitting unit 1, the first elastic surrounding unit 3, the second light-transmitting unit 2 and the second elastic surrounding unit 4 can be tightly stacked on top of one another in sequence and retained between the first retaining seat 61 and the second retaining seat 62, thus the liquid lens package structure of the instant disclosure can be applied to prevent the two predetermined liquids (L1, L2) from leaking out between the second light-transmitting element 20 and the first elastic surrounding body 30 during heat expansion or between the first light-transmitting element 10 and the first elastic surrounding body 30 during cold contraction.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A liquid lens package structure, comprising:
a first light-transmitting unit including at least one first light-transmitting element, wherein the at least one first light-transmitting element has a first top surface and a first bottom surface corresponding to the first top surface;
a second light-transmitting unit including at least one second light-transmitting element, wherein the at least one second light-transmitting element has a second top surface and a second bottom surface corresponding to the second top surface;
a first elastic surrounding unit including at least one first elastic surrounding body, wherein the at least one first elastic surrounding body is disposed between the at least one first light-transmitting element and the at least one second light-transmitting element to form an enclosed space among the at least one first light-transmitting element, the at least one second light-transmitting element and the at least one first elastic surrounding body for receiving and enclosing two predetermined liquids that do not be mingled with each other, and the at least one first elastic surrounding body has a first surrounding bottom side contacting the first top surface of the at least one first light-transmitting element and a first surrounding top side corresponding to the first surrounding bottom side and contacting the second bottom surface of the at least one second light-transmitting element;
a second elastic surrounding unit including at least one second elastic surrounding body disposed on the second top surface of the at least one second light-transmitting element, wherein the at least one second elastic surrounding body has a second surrounding bottom side contacting the second top surface of the at least one second light-transmitting element and a second surrounding top side corresponding to the second surrounding bottom side; and
a package unit including a first retaining seat and a second retaining seat mated with the first retaining seat, wherein the first retaining seat has a first opening for exposing one portion of the first bottom surface of the at least one first light-transmitting element, the second retaining seat has a second opening for exposing one portion of the second top surface of the at least one second light-transmitting element, and the first light-transmitting unit, the second light-transmitting unit, the first elastic surrounding unit and the second elastic surrounding unit are disposed between the first retaining seat and the second retaining seat.

2. The liquid lens package structure of claim 1, wherein both the at least one first light-transmitting element and the at least one second light-transmitting element are transparent glass plate bodies, and the first top surface and the first bottom surface of the at least one first light-transmitting element and the second top surface and the second bottom surface of the at least one second light-transmitting element are plane surfaces.

3. The liquid lens package structure of claim 1, wherein the first retaining seat is abutted against the first bottom surface of the at least one first light-transmitting element, the second retaining seat is abutted against the second surrounding top side of the at least one second elastic surrounding body, and the first light-transmitting unit, the first elastic surrounding unit, the second light-transmitting unit and the second elastic surrounding unit are tightly stacked on top of one another in sequence.

4. The liquid lens package structure of claim 1, further comprising: a third elastic surrounding unit including at least one third elastic surrounding body disposed on the first bottom surface of the at least one first light-transmitting element, wherein the at least one third elastic surrounding body has a third surrounding top side contacting the first bottom surface of the at least one first light-transmitting element and a third surrounding bottom side corresponding to the third surrounding top side, wherein the first retaining seat is abutted against the third surrounding bottom side of the at least one third elastic surrounding body, the second retaining seat is abutted against the second surrounding top side of the at least one second elastic surrounding body, and the third elastic surrounding unit, the first light-transmitting unit, the first elastic surrounding unit, the second light-transmitting unit and the second elastic surrounding unit are tightly stacked on top of one another in sequence.

5. The liquid lens package structure of claim 1, wherein both the at least one first elastic surrounding body and the at least one second elastic surrounding body are elastic O rings, the size of the at least one first elastic surrounding body is the same as or different from the at least one second elastic surrounding body, the package unit has a predetermined thickness formed by mating the first retaining seat and the second retaining seat, and the number of the two predetermined liquids is adjusted according to the predetermined thickness of the package unit.

6. The liquid lens package structure of claim 1, wherein the first retaining seat has a plurality of first retaining elements projected upwardly from the top surface thereof and a plurality of first retaining grooves respectively disposed on the first retaining elements, and the second retaining seat has a plurality of second retaining elements disposed on the inner surface thereof and respectively received in the first retaining grooves and a plurality of second retaining grooves respectively adjacent to the second retaining elements for respectively receiving the first retaining elements, thus the relative position between the first retaining seat and the second retaining seat is fixed.

7. The liquid lens package structure of claim 1, wherein the first retaining seat has an outer screw structure projected upwardly from the top surface thereof, and the second retaining seat has an inner screw structure disposed on the inner surface thereof for mating with the outer screw structure, thus the relative position between the first retaining seat and the second retaining seat is fixed.

8. The liquid lens package structure of claim 1, further comprising: a plurality of securing elements, wherein the first retaining seat has a plurality of first through holes, the second retaining seat has a plurality of second through holes correspondingly communicated with the first through holes, and each securing element passes through the corresponding first through hole and the corresponding second through hole, thus the relative position between the first retaining seat and the second retaining seat is fixed.

9. The liquid lens package structure of claim 1, wherein the first retaining seat has a plurality of extending grooves concaved inwardly from the peripheral surface thereof and a plurality of retaining grooves respectively connected with the extending grooves, and the second retaining seat has a plurality of extending portions extended downwardly from the peripheral surface thereof and respectively received in the extending grooves and a plurality of retaining elements respectively connected with the extending portions and respectively retained in the retaining grooves, thus the relative position between the first retaining seat and the second retaining seat is fixed.

10. The liquid lens package structure of claim 1, wherein one of the at least one first light-transmitting element and the at least one second light-transmitting element is a driving circuit board.

11. The liquid lens package structure of claim 1, wherein both the at least one first elastic surrounding body and the at least one second elastic surrounding body are pressed by a predetermined compression deformation.

\* \* \* \* \*